United States Patent [19]

Kim

[11] 4,227,870
[45] Oct. 14, 1980

[54] APPARATUS FOR WORKING RUBBER COMPOUNDS

[75] Inventor: Heung T. Kim, Avon Lake, Ohio

[73] Assignee: The B. F. Goodrich Company, Akron, Ohio

[21] Appl. No.: 20,289

[22] Filed: Mar. 14, 1979

[51] Int. Cl.³ .............................................. B29F 3/02
[52] U.S. Cl. .............................. 425/208; 264/176 R; 366/79; 366/87; 425/205; 425/209
[58] Field of Search ............... 425/208, 209, 200, 205; 264/176 R; 366/79, 87

[56] References Cited

U.S. PATENT DOCUMENTS

| | | | |
|---|---|---|---|
| 3,271,819 | 9/1966 | Lacher | 425/208 |
| 3,445,890 | 5/1969 | Heston et al. | 425/209 |
| 3,650,652 | 3/1972 | Dray et al. | 425/208 |
| 3,680,844 | 8/1972 | Menges et al. | 425/205 |
| 3,698,541 | 10/1972 | Barr | 425/208 |
| 3,867,079 | 2/1975 | Kim | 425/208 |
| 3,888,469 | 6/1975 | Geyer | 425/208 |
| 4,107,260 | 8/1978 | Dougherty | 264/176 R |

*Primary Examiner*—Jeffery R. Thurlow
*Attorney, Agent, or Firm*—Joseph Januszkiewicz

[57] ABSTRACT

An extruder for working rubber and other elastomeric compounds having an extruder screw with a feed section, metering section and a transition section. The transition section has a plurality of working sections in succession with each section having a pair of helical flights defining a pair of primary channels. One of such helical flights has a flight that leads off to define a secondary channel for leading off the portion of the compound subjected to a shearing action from the primary channels. The primary channels decrease in volume while their axial width remains the same. The secondary channel increases in axial width and depth to accommodate the worked rubber compound.

6 Claims, 6 Drawing Figures

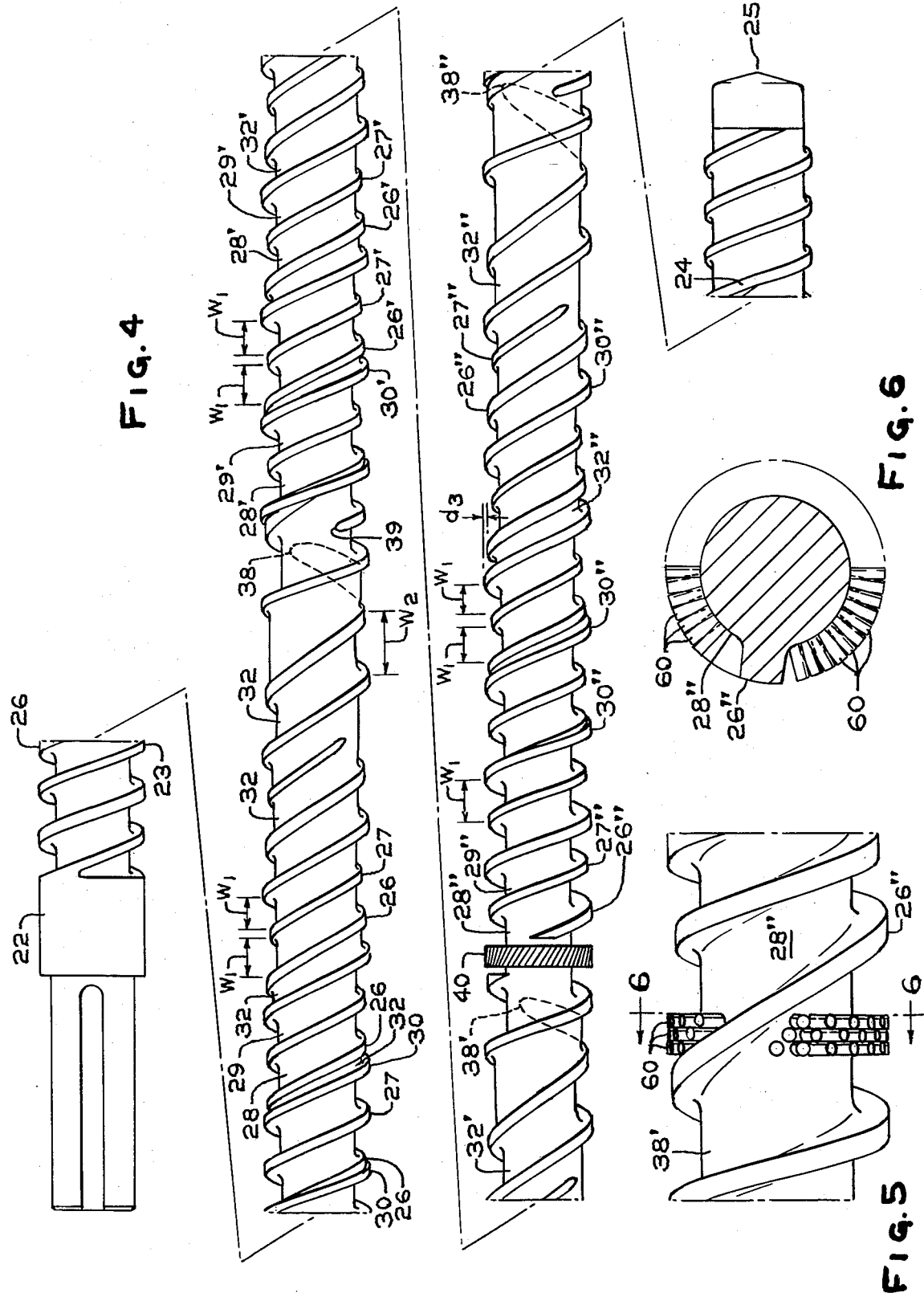

APPARATUS FOR WORKING RUBBER COMPOUNDS

BACKGROUND OF THE INVENTION

This invention relates to an apparatus for processing rubber and more particularly to an extruder with an extrusion screw which plasticates and mixes rubber compounds.

The conventional practices for processing rubber and its associated compounds is to combine them in a milling or calendering machine which comprises two rotating rollers which have a small gap therebetween. As these rollers rotate, the rubber compound undergoes a shearing action involving a plastication and mastication. The working action of the rollers is substantially at the nip of the rollers, with the remaining portion of the cycle undergoing a relaxation and a reorientation of the distorted particles. It is only when the rubber compound goes through the nip or gap of the rollers that the material is worked. The present invention provides a continuous and repeated shearing action with the use of an extruder and extruder screw, wherein the extruder screw design permits repeated mastication and shearing along its length. Such apparatus improves the efficiency of the extruder in this process. The apparatus is novel over conventional extruders which could not work the rubber to its proper temperature and plasticity.

SUMMARY OF THE INVENTION

The present invention contemplates the use of a rotary feed screw in an extruder to work rubber compounds wherein the feed screw has a repetitive design in helical flights defining primary grooves and a secondary groove. While the primary grooves retain a constant width to expose a maximum amount of the rubber compound to a shearing action, the secondary groove receives the sheared and worked rubber compound for repeated shearing action further downstream of the first shearing action. The second groove is proportioned in each repetitive action to increasingly receive the sheared rubber compound and prepares it for further shearing.

BRIEF DESCRIPTION OF THE DRAWINGS

FIG. 4 is a side elevational view of portions of an extruder screw and when longitudinally aligned form an entire view of the extruder screw.

FIG. 5 is an enlarged fragmentary side elevational view of a modified form of a portion of the extruder screw.

FIG. 6 is an enlarged front view with a portion in cross section of the modified portion of the extruder screw taken on line 6—6 of FIG. 5.

DETAILED DESCRIPTION

Figure 1:
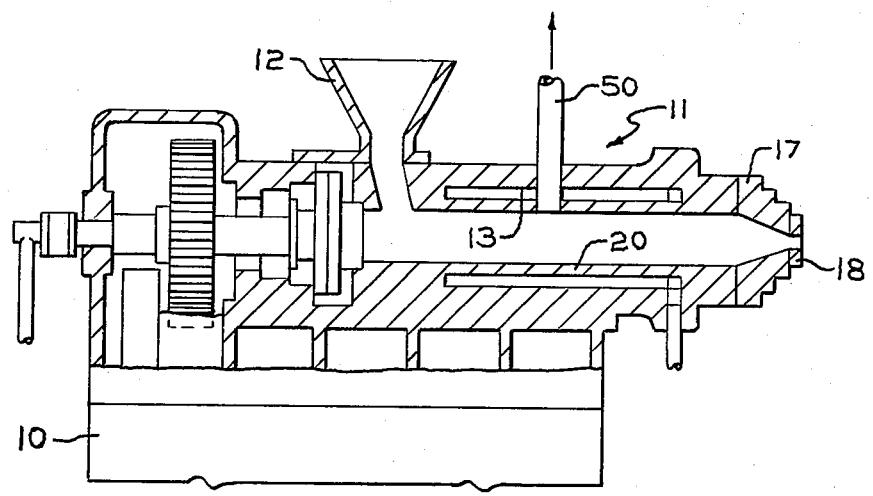
FIG. 1 is a side elevational view with a portion in cross section of an extruder without the feed screw.

Referring to the drawings, wherein like reference numerals designate like or corresponding parts throughout the several views, there is shown in FIG. 1 a base 10 of an extruder designated generally be reference numeral 11. Extruder 11 has a hopper 12, a cooling means 13 for circulating water or similar cooling medium, an extruder head 17, a die 18, transmission means driven by suitable means and a cylinder 20 in which a feed screw is journaled for rotation.

The feed screw is divided into three sections, a feed section from point 22 to point 23, a transition section from point 23 to point 24, and a metering section from point 24 to point 25, the front end of the feed screw. Although the feed and metering sections are shown as relatively short in length, the showing is only representative of the different section and their lengths may vary to correspond to the need and use. The metering section comprises a longitudinal section having a helical flight that terminates adjacent the end 25 of the feed screw.

Figures 2, 3:
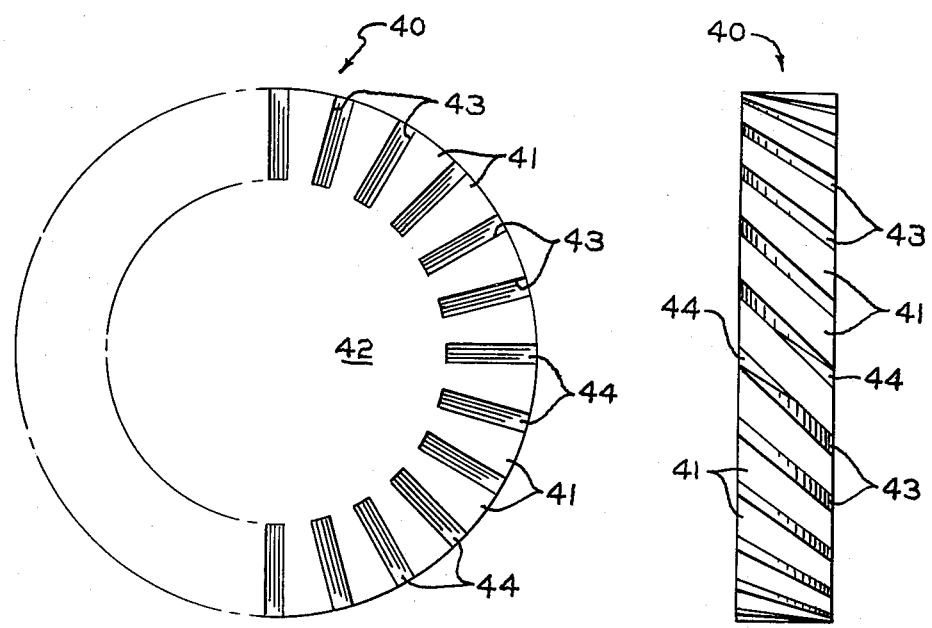
FIG. 2 is a schematic cross sectional view of a shear ring.
FIG. 3 is an enlarged side elevational view of a shear ring.

The transition section or working section as shown in FIG. 4 has a pair of primary flights 26 and 27 defining a pair of primary channels 28 and 29. A secondary helical flight 30 emerges from flight 26 defining a secondary channel 32. The respective pair of primary flights 26 and 27 have leading faces which aid in the mastication and kneading of the rubber compound prior to such rubber compound being subjected to a shearing action as it is passed over the outer surface of primary flight 26 into secondary channel 32. The width $W_1$ of the groove of each primary channels 28 and 29 is the same throughout the entire length of the transition section, while the depth of the respective primary channels 28 and 29 progressively diminishes from where the secondary channel 32 begins to where the secondary channel 32 ends as at point 38 and the secondary channel then becomes the primary channel as at point 39 where the secondary channel is divided into two primary channels 28' and 29' by flights 26' and 27'. As in the first portion or section of the transition section a secondary helical flight 30' emerges from the primary flight 26' defining a secondary channel or groove 32'. The respective pair of primary flights 26' and 27' have leading faces which aid in the mastication and kneading of the rubber compound prior to such rubber compound being subjected to a shearing action as it is passed over the outer surface of primary flight 26' into secondary channel 32'. As in the first section of the transition portion of the feed screw the width $W_1$ of the grooves of each primary channel 28' and 29' is the same throughout the entire length of the transition section, while the depth of the respective primary channels 28' and 29' progressively diminish from where the secondary channel 32' begins to where the secondary channel 32' ends as at point 38' where a shear ring 40 encompasses the feed screw. Shear ring 40 has a plurality of radially extending fins 41 that extend radially outwardly and at a helical angle from the core 42 of the feed screw. Each fin 41 has a pair of side portions 43 such that a pair of adjacent fins 41 define a groove 44 between adjacent side portions 43. Groove 44 extends radially outwardly from the outer surface of the core 42 of the feed screw to the peripheral surface of the shear ring 40. As seen in elevational view in FIG. 3, the grooves 44 are slanted or helical to prevent a straight pass through the shear ring thereby increasing the shear occurring in the rubber compound as it is moved axially therethrough while increasing the heat transfer through the compound.

Downstream from the shear ring 40, the feed screw has a pair of flights 26" and 27" defining grooves 28" and 29" whose widths $W_1$ are identical to those of the grooves 28, 29, 28' and 29'. As described in the first two sections of the transition portion of the feed screw, a secondary helical flight 30" emerges from the primary flight 26" defining a secondary channel or groove 32". The respective pair of primary flights 26" and 27" have leading faces which aid in the mastication and kneading of the rubber compound prior to being subjected to a shearing action as it passes over the periphery of the primary flight 26" into the secondary channel 32". All of the secondary channels or grooves 32, 32' and 32" progressively increase in axial width as they progress in the axial direction while simultaneously increasing in the depth of their groove while the primary channels 28, 29, 28', 29', 28" and 29" decrease in the depth of their grooves while their width $W_1$ remains constant.

The third described section of the transition portion of the feed screw terminates into the metering section from point 24 to point 25 which in effect is the torpedo of the feed screw.

The difference in radial dimension from the longitudinal center line of the feed screw between the primary flights and the secondary flight is $d_3$ such as to assure the flow of less viscous rubber compound from the primary channels 28, 29, 28', 29', 28" and 29" into the secondary channels 32, 32' and 32". The primary channels merge with the secondary channels 32, 32', and 32" at points 38, 38' and 38" respectively wherein the clearance space between the working surface of the primary channels at this point and the barrel is equal to the clearance space between the top of the flight of the primary flight and the interior wall of the barrel.

The extruder, adjacent to but downstream of the shear ring 40 is vented to atmosphere by a conduit as at 50 to remove any gasses that have developed in the extruder barrel due to the mastication of the rubber compound. As the feedscrew is rotated, the feed section of the screw from point 22 through 23 picks up the unrefined rubber compound which is deposited into the hopper 12 and delivers the compound in a preworked condition to the transition section beginning at point 23. The leading faces of the primary flights 26 and 27 exert a continuous pressure on the moving worked material to knead and masticate the rubber compound with that portion of the masticated material which comes in contact with the walls of the cylinder 20 being subjected to a shearing action and is directed away from the masticated portion of the rubber compound into the secondary groove or channel 32. The clearance space between the upper portion of the primary flights 26 and 27 and the barrel 20 is greater than the clearance space between the upper portion of secondary flight 30 and the barrel thereby accommodating the flow of the rubber compound subjected to the shearing action. Since the depth of the primary channels 28 and 29 diminish progressively in volume, it pushes the remaining masticated rubber compound upward towards the cylinder walls for subjecting it to a shearing action. The cross-sectional width $W_1$ remains constant for the respective primary grooves to expose as much of the masticated rubber compound as possible to the effect of the heated barrel. Such structure exposes the maximum amount of area to the working of the barrel and the screw and continues to masticate the material and convey it axially until subjected to the shearing action described above, afterwhich the rubber compound subjected to such shearing is moved into the secondary channel where it undergoes a relaxation and reorientation of the distorted particles. The small clearance space between the outer periphery of the secondary flight 30 and the barrel acts as a dam and exerts some mastication on the materials going over the flights in addition to the high shear that is effected. This action is repeated in the second section of the transition portion of the feed screw as the rubber material passes from the primary channels 28' and 29' into the secondary channel 32'. The rubber compound is then subjected to a further shearing action is going through the shear ring 40. Thereafter the above described mastication and shearing is repeated in the third section of the transition portion of the feed screw as the rubber compound material passes from the primary channels 28" and 29" into the secondary channel 32" and thence via the metering section through the die 18. With this described structure at any point in the screw there would be two channels and the materials would move forward axially allowing the flights to masticate the rubber compound materials repeatedly three to four times with low shear helical flow regions in between thus enabling the materials to relax and reorient themselves. The entire process is accomplished under high pressure with all portions of the rubber compound constantly moving and being deformed in the channel and masticated between flights. Although the described embodiment above discloses 3 sections or stages in the transition sections it is to be understood that the number of stages can be increased or decreased to accommodate the result desired.

A modification of the described invention is shown in FIGS. 5 and 6, wherein in lieu of the shear ring 40 a plurality of round cylindrical pins 60 arranged in rows circumferential around the core of the extruder screw to operate to break up the flow of the rubber material being plasticated. The pins in each row are staggered to interrupt the flow of materials. The circumferentially extending rows of pins 60 are interrupted by the screw flight 26". The portion immediately downstream from the rows of pins 60 is vented to atmosphere as in the first described embodiment.

It will be apparent that, although a specific embodiment and certain modifications of the invention have been described in detail, the invention is not limited to the specifically illustrated and described construction since additional mastication sections may be added to the transition section or more shear rings may be utilized without departing from the principles of the invention.

I claim:

1. In an extruder for processing rubber compounds comprising a cylinder; said cylinder having die means at one end thereof; a feed screw rotatably mounted in said cylinder and extending longitudinally therethrough for moving rubber compounds therethrough to progressively masticate and subject said compounds to a shearing action; said feed screw having a feed section, a transition section and a metering section; said transition section having a plurality of first means and a plurality of second means; each of said first means is followed by one of said second means to form a plurality of successive stages; each of said first means having helical flights defining a pair of channels for operatively exerting continuous pressure on said rubber compound for moving said rubber compound and subjecting said compound to a mastication; each of said second means integral with said feed screw of said transition section for continuously leading off the masticated portion of said compound that is subjected to a shearing action progressively from an adjacent one of said first means as said masticated and sheared rubber compound is directed away from and not through the remaining rubber compound; said channels of said first means having constant axial width with decreasing radial depths in the direction of said die means providing a constant amount of surface area exposed to said cylinder for material carried by said channels; each of said second means defines a groove having an increasing axial width with increasing radial depth in the direction of said die means; and each of said grooves of said second means progressively increases in cross-sectional dimension toward said die means.

2. In an extruder for processing rubber compounds as set forth in claim 1 wherein a shear ring is interposed on said feed screw between a pair of said successive stages.

3. In an extruder for processing rubber compounds as set forth in claim 2 wherein said shear ring has a plurality of radially extending fins that extend at a helical angle in an axial direction along said extruder screw.

4. In an extruder for processing rubber compounds as set forth in claim 2 wherein said shear ring has a plurality of radially extending cylindrical pins arranged in circumferentially extending rows.

5. In an extruder for processing rubber compounds comprising a cylinder; said cylinder having a die means at one end thereof; a feed screw rotatably mounted in said cylinder for moving rubber compounds therethrough to progressively masticate and shear said compounds for extrusion therefrom; said feed screw having a feed section at one end and a metering section at the other end; said feed screw having a transition section between said feed section and said metering section; said transition section having a plurality of successive working sections; each working section having a first and second means; said first means having at least a pair of helical flights for operatively exerting continuous pressure on said rubber compounds; said second means having at least one helical flight integral with said feed screw and cooperative with an adjacent one of said helical flights of said first means to define a groove for continuously leading off the portion of said compound subjected to a shearing action by said helical flight of said first means progressively receive worked compounds.

6. In an extruder for processing rubber compounds as set forth in claim 5 wherein said helical flights of said first means for each working section defines a pair of grooves for moving and masticating said rubber compound, each of said pair of grooves of said first means have a constant axial width to maintain a constant amount of the rubber compound of the moving material to contact said cylinder; and each of said grooves of said second means have an increasing axial width and increasing radial depth to provide grooves which progressively increase in cross-sectional dimension in a direction toward said die means.

* * * * *